R. T. F. DODDS.
GRAIN SEPARATOR.
APPLICATION FILED MAR. 2, 1916.
1,321,510.
Patented Nov. 11, 1919.
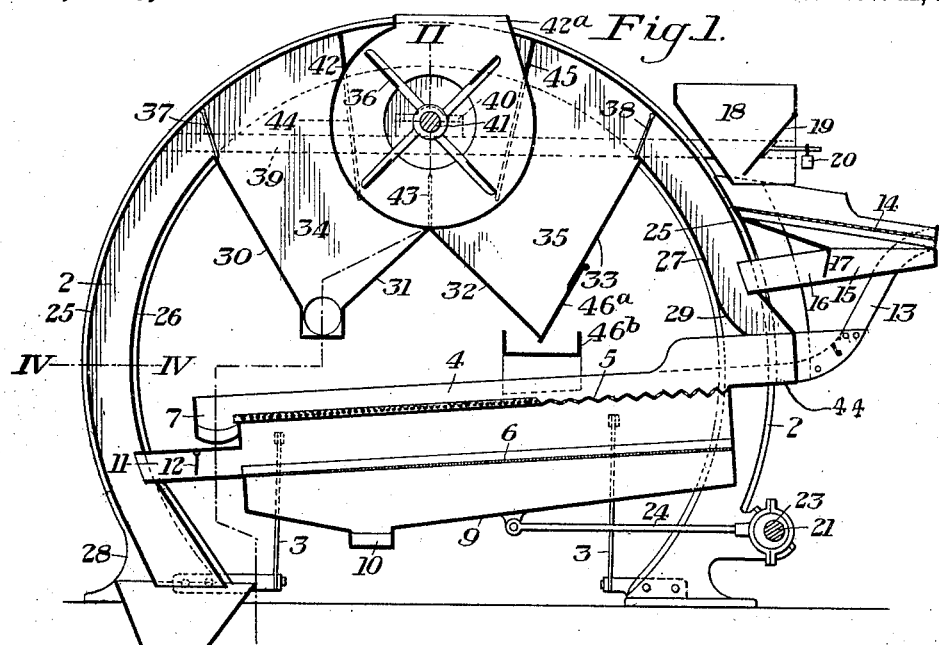
Fig. 1.
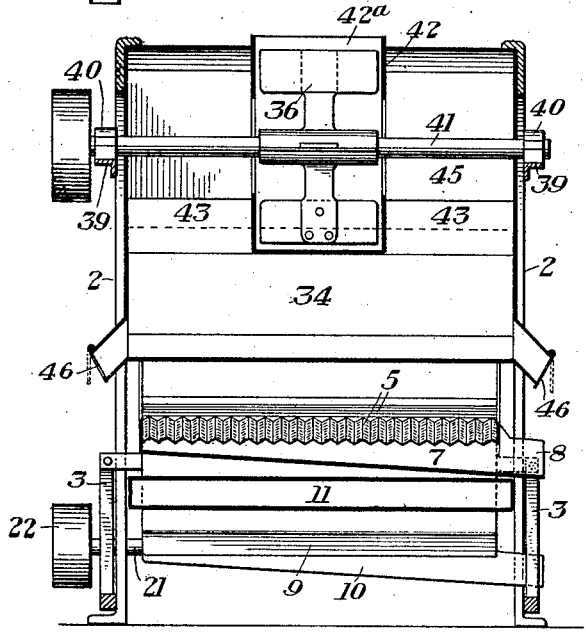
Fig. 2.
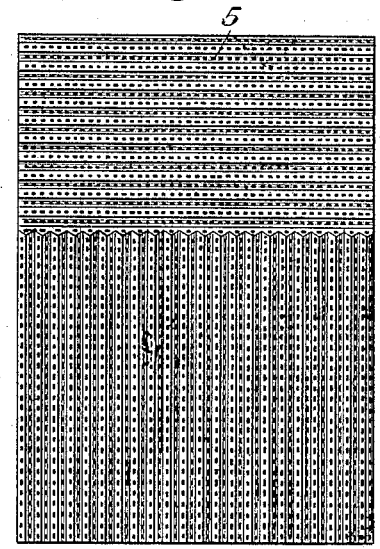
Fig. 3.
Fig. 4.
WITNESSES
R. A. Balderson
J. B. Bluming
INVENTOR
R. T. F. Dodds
by Bakewell, Byrnes Parmelee
Attys.

UNITED STATES PATENT OFFICE.

ROWAN T. F. DODDS, OF DECATUR, ILLINOIS.

GRAIN-SEPARATOR.

1,321,510.  Specification of Letters Patent.  Patented Nov. 11, 1919.

Application filed March 2, 1916. Serial No. 81,660.

*To all whom it may concern:*

Be it known that I, ROWAN T. F. DODDS, a citizen of the United States, residing at Decatur, in the county of Macon and State of Illinois, have invented a new and useful Improvement in Grain-Separators, of which the following is a full, clear, and exact description, reference being had to the accompanying drawings, forming part of this specification, in which—

Figure 1 is a longitudinal view through the center of one form of machine embodying my invention.

Fig. 2 is a sectional view on the irregular line II—II of Fig. 1.

Fig. 3 is a plan view of the top screen of the shaker; and

Fig. 4 is a detail sectional view on the line IV—IV of Fig. 1.

This invention relates to an improvement in separators, for separating foreign material from grain, and is designed to provide a cheap and efficient device of this character which can readily be assembled, is cheap in construction, and which will occupy a minimum amount of floor space. Generally speaking, my invention comprises a shaker which is arranged to first remove strings, bagging and foreign material of this character, the material being then fed through a chute through which air is passed in the reverse direction of the movement of the material to remove some of the lighter particles of foreign matter. The grain and heavier particles are then fed onto a screen on the shaker, through which the grain is adapted to pass onto a finer screen through which sand and fine particles of heavy material are passed, the grain is then fed through a chute through which air is drawn to remove any further lighter particles which have not been removed in the first air chute.

The precise nature of my invention will be best understood by reference to the accompanying drawings, which will now be described, it being premised, however, that various changes may be made in the details of construction and the general arrangement of the parts, without departing from the spirit and scope of my invention as defined in the appended claims.

Referring to the accompanying drawings, the reference character 2 designates housings or frame members which are of arch form, and supported on lugs on this frame member by means of flexible rods 3 is a shaker 4, which comprises a coarse screen 5 and a fine screen 6. The coarse screen is corrugated transversely on the one end thereof, the angle of said corrugations being gradually reduced from the end toward the central portion of the screen. The remainder of the screen is provided with longitudinal corrugations, and is provided with openings through which the grain falls onto the screen 6. The transverse corrugations of the screen 5 are also provided with similar openings for the grain. 7 is an outlet spout at the end of the screen 5 which is arranged to receive all material which will not pass through the openings therethrough, and which chute leads outwardly to the side of the machine, as indicated at 8 in Fig. 2. The bottom, ends and sides of the shaker are inclosed with sheet metal, the bottom 9 sloping toward a downwardly and outwardly inclined chute 10 for conveying off the sand which passes through the screen 6. The one end of the shaker is provided with an inclosed chute 11 having a valve 12 therein through which the clean grain is passed. The frame of the shaker 4 is provided with rearwardly extending arms 13, and connected to these arms is a coarse screen 14 which is inclined downwardly and forwardly, and 15 designates a hopper below the screen 14 for receiving the material which passes through said screen. The front end of this hopper 15 is provided with an inclosed chute 16, and 17 is a gate or valve for closing the entrance to said chute. 18 designates a feed hopper for feeding the material to be cleaned to the machine, which is provided with a hinged gate 19 having an adjustable weight 20 which is arranged to be adjusted for determining the size of the opening through which the material is to be fed.

21 is a shaft which may be driven in any desired manner, preferably by means of a pulley 22, and which shaft is provided with an eccentric 23 for the eccentric rod 24 which is connected to the shaker 4 and is adapted to vibrate the same. Connected to the outer portions of the frame members 2 is a sheet metal casing 25, which extends from the bottom of the frame members or housings at one side to the top of the shaker at the other side of the machine. Connected to the inner sides of the frame members 2 are curved metal sheets 26 and 27, there being a curved channel formed between the plate 26 and the casing 25 at one side of the machine, and a similar channel between the plate 27 and the casing 25 at the other side of the machine. The lower end of the casing at the left hand side of the machine is bent inwardly, as at 28, to a point immediately below the extreme end of the chute 11, which extends through an opening in the plate 26, the chute entirely closing said opening so that no air is admitted therethrough. The curved plate 27 is also provided with a bent portion 29, which extends beyond the extreme end of the chute 16. Formed between the housing members 2 above the shaker by means of angular sheet metal plates 30, 31, 32 and 33 are receiving chambers 34 and 35, for the light material which is removed from the grain by means of a fan 36. The chamber 35 communicates with the channel between the plate 27 and the casing, while the chamber 34 communicates with the channel between the plate 26 and the casing. The entrances from said channels to the chambers are controlled by means of gates 37 and 38, so that the proportion of air drawn by the fan through said channels can be regulated. The ends of the chambers 34 and 35 are inclosed by means of sheet metal plates which are connected to the frame members 2. Connected to the outer faces of the frame members 2 are angle bars 39 which form supports for the hopper 18, and for bearings 40 for the fan shaft 41. 42 is the fan casing which is within the chambers 34 and 35, and is provided with side openings through which the air is drawn from the chambers 34 and 35, and is also provided with an outlet 42$^a$ through which the air is passed.

43 are division plates between the chambers 34 and 35 on opposite sides of the fan chamber, and 44 and 45 are baffle plates within the chambers 34 and 35, respectively. These baffle plates are arranged to deflect material sucked out of the grain downwardly into the bottoms of the chambers 34 and 35. The chamber 34 is provided with suitable end outlet openings having flap-gates 46 which are arranged to be held in their closed positions by means of the suction of the fan. If desired, suitable conveyers may be arranged in the chambers 34 and 35 for conveying the material therefrom. The flap-gates 46$^a$ at the bottom of the chamber 35 are placed at the side thereof and 46$^b$ is a chute or spout attached to the shaker to receive the material passing from the chamber 35.

The operation of the device is as follows:

The grain to be cleaned is fed into the hopper 18, and from there onto the screen 14, the grain and finer particles passing through the screen 14 into the hopper 15, while any coarse material, such as strings, rags, etc., will fall off the end of the screen. The material will pass from the hopper 15 into the machine through the chute 16. As the flap-gate 17 normally rests on the top of the grain being fed into the machine, very little, if any, air will be sucked in through the chute 16. The screen 14 effects the separation of the coarser materials from the grain before it is acted on by the current of air in the separator and keeps them from clogging the conveyer and filling the settling chamber 35. The grain being fed from the chute 16 will drop vertically and be thrown laterally by means of the bent portion 29, so that the air which is sucked up through the opening below the lower end of the portion 29, will pass around each particle of grain and carry off the lighter particles, such as the chaff, into the chamber 35. The laterally bent portion 29 forms an inclined air passage across which the grain from the chute 16 falls in a sort of curtain striking the lower end of the bent portion 29 which extends beneath the end of the chute 16. Because of this arrangement the entire current of air is drawn up behind the curtain of grain falling from the chute 16 and is compelled to pass laterally through the stream of falling grain. The grain which is fed to the screen drops onto the plate 44, from which it passes onto the screen 5. The grain and sand will pass through the openings in the screen, while the large foreign matter will pass over the top of the screen and fall into the chute 7. The grain will be fed down over the screen 6 into the chute 11, while the sand will be passed through the screen onto the bottom plate 9. The grain and lighter particles which move down over the screen 6 pass under the gate 12 which will prevent any air from passing through the chute 11, and the material which is fed through the chute 11 will fall in a vertical direction onto the bent portion 28 of the casing 25, and from there into the outlet hopper 47. The fan 36 will also suck air up through the outlet hopper 47 which will pass around the grain to remove any light material which has passed through the screen 5, and which material will be carried into the chamber 34. Because of the inclination of the lower end of the air passage formed between the plates 25 and 26, the curtain of grain falling from the chute 12 falls the entire distance across the passage striking the lower end 28 of the casing plate 25. In this way, the entire current of air is caused to blow through the stream of grain, the grain falling substantially vertical and the air passing upwardly and laterally through it.

The gates 37 and 38 are set to proportion the air passing up to different sides of the machine to the fan.

By providing a screen which is corrugated, I provide means whereby oats can readily be separated from wheat or rye, as the grains of oats will lie in a transverse direction on the first set of corrugations, and in a longitudinal direction on the second set of corrugations. so that the oats will pass out with small sticks and other coarse material through the chute 7.

The advantages of my invention result from the provision of a machine having a housing member on each side of the machine for supporting the various parts thereof, together with receiving chambers above the screen, which communicate with air channels through which the grain to be cleaned is passed. Also from the provision of a tortuous passage for the grain within the air channels, so that the air will pass through the falling stream of grain. Also from the provision of means for removing strings and bagging from the material before it is fed into the machine and thereby eliminating danger from fire. In the form shown, the machine comprises two semi-annular housing members of metal, for supporting the sheet metal members, the arrangement being such that there are no ledges upon which dirt can collect, while the air chutes at the head and tail of the machine are arranged in stream lines to reduce resistance to a minimum, and thereby increase the efficiency of the separator and reduce the size of the fan.

I claim:

1. A separator having two horse-shoe shaped housing members, a refuse chamber between the housing members at the juncture between the legs of said members, said chamber being formed of members connected to and supported by the housing members, a stream line air chute at each end of the structure converging toward each other at their upper ends, said air chutes being formed of members connected to the legs of the housing members, a shaker between the housing members and supported thereon, said shaker lying between the air chutes and below the refuse chamber, an exhaust fan within the refuse chamber arranged to cause air to flow upwardly through the two air chutes, means to feed material to be cleaned to the shaker through one of the air chutes, and means for delivering some of the material from the shaker to the other air chute, substantially as described.

2. A separator having a housing formed of two arched horse-shoe shaped members, each of said members having a web and two flanges, the flanges of the two housing members extending toward each other, the inner flange on each of said members being cut away at its intermediate portion, members connecting the flanges of one member to the other member, said members together with the web of the housing members forming stream line air chutes, a refuse chamber at the upper end of said air chutes formed of members connected to and supported by the housing members, substantially as described.

3. A separator having a housing formed of two curved horse-shoe shaped members, each of said members having a web and two flanges, the flanges of the two housing members extending toward each other, the inner flange on each of said members being cut away at its intermediate portion, members connecting the flanges of one member to the other member, said members together with the web of the housing members forming air chutes, a refuse chamber at the upper end of said air chute formed of members connected to and supported by the housing members, and a shaker connected to and supported by the housing members, said shaker extending from one air chute to the other air chute below the refuse chamber, substantially as described.

In testimony whereof, I have hereunto set my hand.

R. T. F. DODDS.

Witnesses:
J. A. DODDS,
ELIZABETH KUKEARY.